Oct. 8, 1957 A. D. PIRONE 2,808,656
GYROMAGNETIC REFERENCE SYSTEMS
Filed Sept. 18, 1953 2 Sheets-Sheet 1
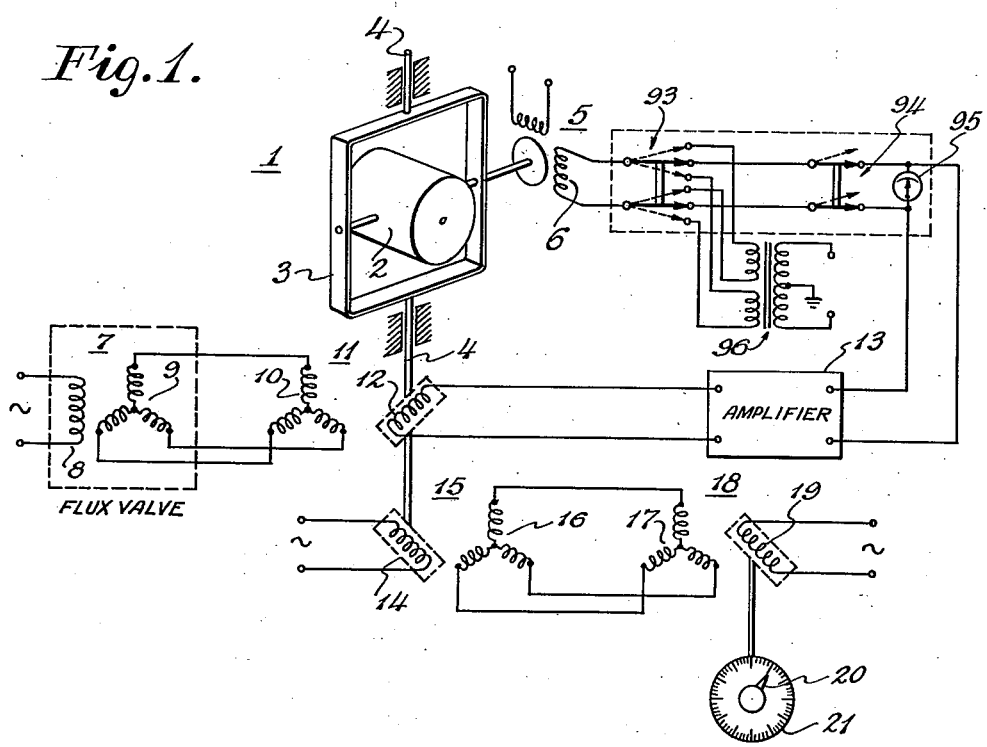
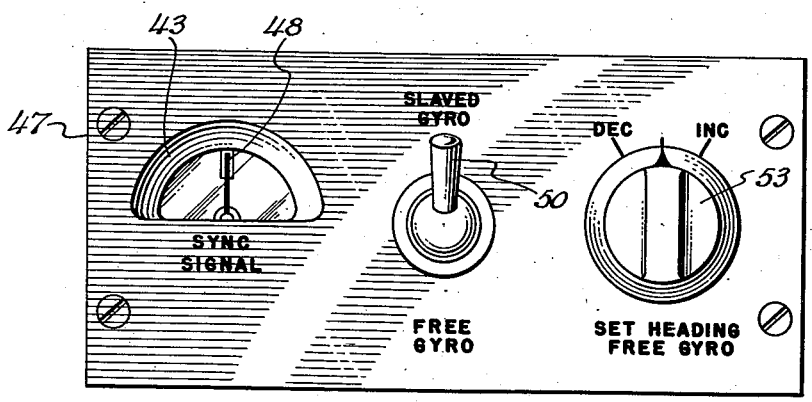
INVENTOR
ALFRED D. PIRONE
BY
ATTORNEY

INVENTOR
ALFRED D. PIRONE
BY
ATTORNEY

United States Patent Office 2,808,656
Patented Oct. 8, 1957

2,808,656

GYROMAGNETIC REFERENCE SYSTEMS

Alfred D. Pirone, Levittown, N. Y., assignor, by mesne assignments, to Sperry Rand Corporation, a corporation of Delaware Application September 18, 1953, Serial No. 381,101

6 Claims. (Cl. 33—222)

This invention relates to gyromagnetic reference systems wherein a directional gyroscope is slaved to the magnetic meridian by a magnetic field sensitive reference device and, particularly, to improvements in such systems to establish and maintain a stabilized reference direction, and to indicate the existence and sense of any asynchronism between the reference direction provided by the magnetic reference device and the reference direction stabilized by the directional gyroscope.

Heretofore, a variety of gyromagnetic reference systems have been developed wherein a directional gyroscope is employed as a primary meridian indicator and is weakly slaved to the magnetic meridian by a torque about its horizontal axis that is controlled from some form of magnetic field sensitive device, such as a magnetic compass or a flux valve compass, arranged to detect the horizontal component of the earth's magnetic field. These devices are particularly useful in aircraft wherein the relative insensitivity of the gyroscope to transient forces is utilized as a means for stabilizing a reference direction during periods when the magnetic reference device may be disturbed.

In all forms of such reference systems, the slaving torque exerted on the gyroscope to cause it to align with the magnetic meridian is made quite low so that its rate of precession is so low that the gyroscope is not materially disturbed during temporary deviations of the magnetic reference device. In practice, a precession rate of from three to six degrees per minute is generally employed. Although such a slaving rate is adequate during normal operation of the system, it is too slow as a general proposition to synchronize the gyroscope with the reference device when the operation of the system is initiated. Furthermore, unless some type of indicating device is provided, it is impossible to tell whether or not the gyroscopic reference direction is properly synchronized with the magnetic reference direction.

As a result, a variety of devices have been proposed to provide fast precession rates when the operation of the system is initiated, and to provide means to indicate the existence and sense of asynchronism. However, most of these devices are extremely complex in nature. The fast precessing devices usually involve manual caging of the directional gyroscope, or disconnecting the gyroscope from the direction indicating element and independently setting the latter; whereas, the synchronism indicating devices usually involve a solenoid operated flag mechanism. As a rule such modifications require a substantial amount of equipment and employ elaborate switching devices to effect the required results.

Despite these prior art modifications, the resulting systems remain inadequate for certain types of operation. For example, when an aircraft is started on an aircraft carrier deck, the vast quantities of metal in the carrier hull so distort the earth's magnetic field in the vicinity of the carrier that any reading obtained from the aircraft's magnetic compass or flux valve may be greatly in error. Thus, if the gyroscopic reference direction is synchronized to the magnetic reference direction, the pilot's heading information would be equally in error at take-off. In addition, as a result of gimbal error or possibly gimbal lock during a fast rate turn or acrobatic maneuver, the gyroscopic reference direction may be considerably in error. In any of these cases an appreciable time interval is usually required to reestablish synchronism between the gyroscopic reference direction and the magnetic meridian by conventional slaving means.

The principal object of the present invention is to improve the arrangement and manner of operation of gyromagnetic reference systems to permit rapid orientation of the directional gyroscope relative to the magnetic meridian independently of its slaving device and, at the same time, to provide an indication of the existence and sense of asynchronism between the gyroscopic reference direction and the magnetic reference direction. A further object of the invention is to provide an improved indicating device for a gyromagnetic reference system to show the direction in which the directional gyroscope should be precessed in order to attain synchronism with the magnetic reference device, and to show when such condition of synchronism is reached. A further object of the invention is to provide an improved precessing control arrangement for a gyromagnetic reference system whereby the directional gyroscope may be precessed independently of the magnetic reference device and at a much faster rate than the normal slaving rate. A further object of the invention is to provide an improved gyromagnetic reference system in which the directional gyroscope may be precessed at a slow rate under control of a magnetic reference device or at a much faster rate under manual control, and in which, in either case, the relationship of the gyroscopic reference direction to the magnetic reference direction is indicated at all times.

These objects are attained by means of a comparatively simple switching arrangement applied to a conventional gyromagnetic reference system whereby the system may be set for "slaved" operation, in which it functions in conventional manner, or for "free" operation, in which the directional gyroscope is disconnected from the control of the magnetic reference device; and wherein means, independent of the magnetic reference device, are provided to precess the gyroscope rapidly during "free" operation; and wherein, at all times, an indicator device responsive to signals resulting from a comparison of the gyroscopic and magnetic reference directions provides a means to determine the existence and sense of asynchronism between such directions.

A preferred form of the invention is shown in the drawings, in which:

Fig. 1 is a schematic diagram of a conventional gyromagnetic reference system;

Fig. 3 is a schematic diagram of a control panel for mounting the several components of the invention.

Figure 2:
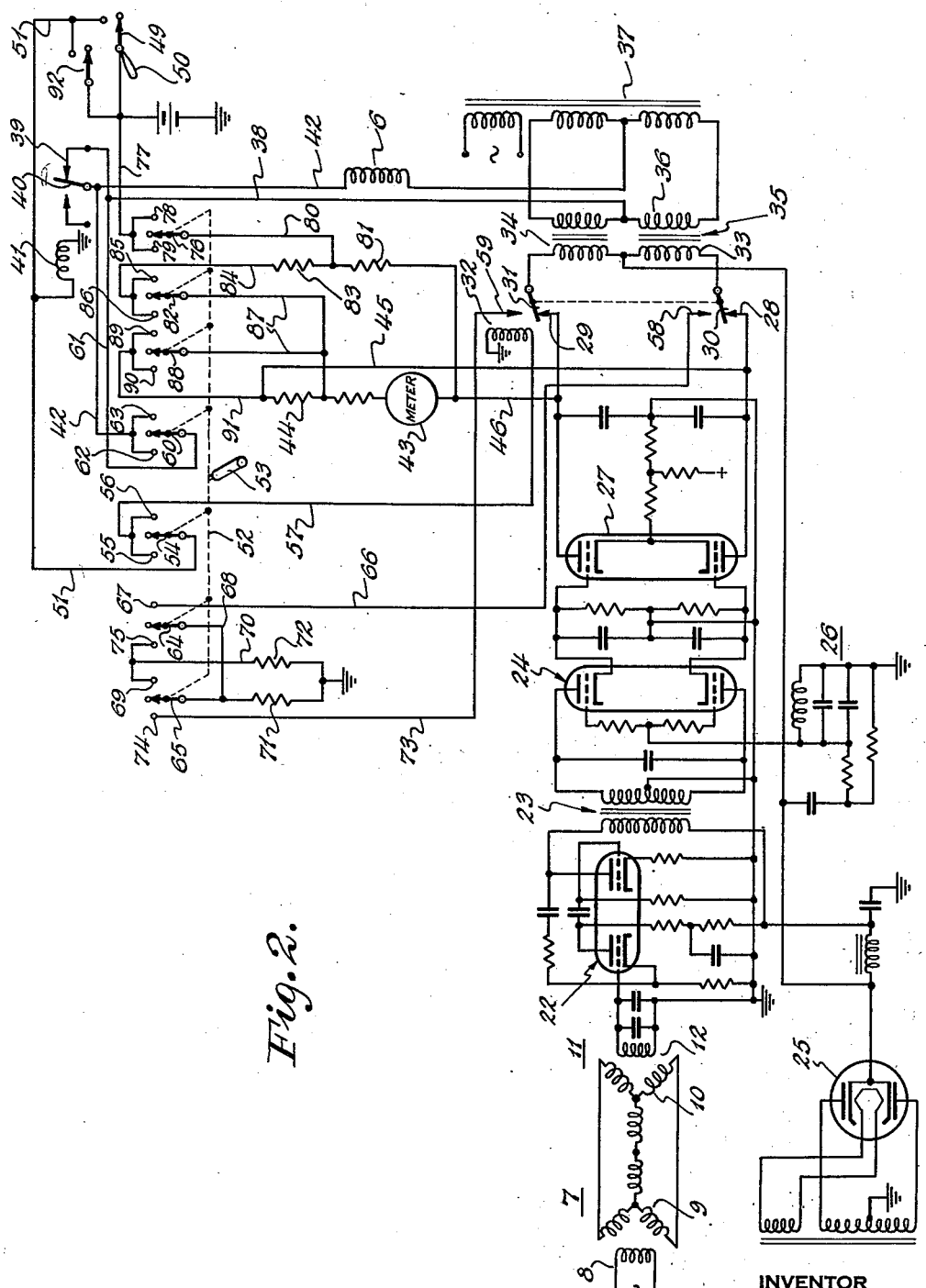
Fig. 2 is a wiring diagram of a signal amplifier, for use with the system disclosed in Fig. 1, together with the elements of the present invention.

Inasmuch as the construction and manner of operation of gyromagnetic reference systems are well known, a brief description of such a system, employing a flux valve as the magnetic field sensitive device, is considered adequate for the purposes of this disclosure. However, it will be apparent that the invention is equally applicable to any gyromagnetic reference system, regardless of the type of magnetic field sensitive device employed.

Referring to Fig. 1, the stabilized directional reference of the system comprises a directional gyroscope 1, of conventional construction, that is mounted for rotation about a vertical axis, and has a spin axis that is maintained tangent to the earth's surface and is also slaved to the earth's magnetic field for the purpose of furnishing a basic reference direction from which the degrees of turn and heading of the aircraft can be determined. The gyroscope rotor may be of any suitable type but is preferably the squirrel cage of a three-phase induction motor that is mounted in bearings in housing 2 and spins about a horizontal axis. Housing 2 supports the stator and is itself free to rotate about a horizontal axis on bearings in vertical ring 3 which is supported for rotation in azimuth by shafts 4 mounted in bearings fixed to the aircraft.

To maintain its spin axis level, the gyroscope is provided with a conventional leveling system (not shown) that includes a torque motor that has a vertical axis and consists of a stator attached to the top of vertical ring 3 and a rotor secured to the frame of the aircraft. This torque motor is controlled by a liquid level which is mounted on gyroscope housing 2 and which, upon deviation from the horizontal, provides voltage signals to cause the motor to exert torque about the vertical axis and thereby precess the gyroscope about its horizontal axis to return its spin axis to the horizontal plane.

In order to vary the orientation of directional gyroscope 2 about its vertical axis it is provided with a precessing device which includes torque motor assembly 5 which, although not shown in detail, may be of the two-phase induction type and consists of a stator mounted on gyroscope housing 2 and a squirrel cage rotor fastened to the side of vertical ring 3. It is actuated by an amplified and phase detected voltage that is derived as described below and applied to its stator control winding 6 to create a torque about its horizontal axis, whereby the gyroscope is precessed about its vertical axis to reduce any discrepancy between the gyroscopic reference direction and the magnetic reference direction determined by the magnetic field sensitive device.

The magnetic field sensitive device of the system which serves to provide the magnetic reference direction comprises a flux valve assembly 7 of conventional construction which, although not shown in detail, includes a three legged spider made of laminated metal of high permeability which is pendulously suspended on a universal joint supported in the aircraft. This element is so mounted that it continuously responds to gravity, and is enclosed in a container filled with a damping liquid to prevent excessive swinging in flight. The spider is provided with a primary winding 8 that is excited from a suitable 400 cycle source in the aircraft. Secondary or pick-up windings 9 surround each leg of the spider and all are Y-connected.

In operation, as the positive half cycle, for example, of the exciting current builds up in winding 8 it sets up a magnetic field which expels the earth's flux from the spider legs. The expelled flux cuts pick-up windings 9 on each leg, inducing current in each. As the positive half cycle of the exciting current decays, the earth's flux again cuts pick-up windings 9 because of the higher permeability of the legs compared to the surrounding air, whereby a current of opposite polarity is induced in pick-up windings 9. Thus, each half cycle of the exciting current produces one full cycle of induced current. The negative half cycle of the exciting current reproduces the action of the positive half. Therefore, the frequency of the current induced in windings 9 is double that of the exciting current, or 800 cycles per second.

The amplitude of the induced current in windings 9 varies in accordance with the number of magnetic lines cutting them, i. e. in accordance with the position of the individual spider legs with regard to magnetic north. Thus, each winding 9 produces a voltage of given amplitude depending on its position relative to the magnetic meridian. These voltages are transmitted to corresponding Y-connected windings 10 of the stator of a synchro receiver 11, such stator being fixed relative to the aircraft, and induce voltages in a synchro rotor 12 that is fixed to lower shaft 4 of vertical ring 3. The voltages in windings 10 create a magnetic vector which varies in position across the stator in the same relationship as the legs of flux valve 7 vary in their orientation to the earth's magnetic field. When rotor 12 is at right angles to this vector, no voltage is induced therein, such condition being referred to herein as the zero signal condition or zero signal relation of the rotor and vector. Whenever the rotor and the vector are at any other relative angle to one another, a voltage is developed in rotor 12 that varies in amplitude proportionally to the magnitude of the angular displacement between the reference direction provided by the directional gyroscope and the magnetic reference direction provided by the flux valve, and varies in phase in accordance with the sense or direction of such angular displacement. This voltage may be referred to as the error signal.

This voltage is amplified and phase detected in amplifier 13, as described below, and is applied to control field 6 of torque motor 5 whereby a precessing torque is applied to gyroscope 1. As the gyroscope precesses, it rotates vertical ring 3 to bring rotor 12 of flux valve synchro 11 into its zero signal relation with the vector in stator 10 thereby stopping generation of voltage in the rotor and halting the action of torque motor 5. Should the spin axis of the gyroscope drift in azimuth during flight, a similar action takes place. Conversely, a zero signal relationship between synchro rotor 12 and the magnetic vector is maintained during turns by the rotation of synchro stator windings 10, which turn with the aircraft, about the axis of rotation of stabilized vertical ring 3 and synchro rotor 12. Thus, synchro receiver 11 constitutes a means for comparing the gyroscopic and magnetic reference directions and for generating precessing control signals that vary in phase and amplitude in accordance with differences in the sense and magnitude of variations between such directions.

In the arrangement disclosed, it may be noted that rotor 12 of synchro receiver 11 is fixed in azimuth relative to the spin axis of the directional gyroscope. However, it is apparent that the rotor may be arranged to be rotatable relative to such spin axis, as shown in Patent No. 2,574,471 issued to C. F. Fragola on November 13, 1951, should a particular application so require.

The system, as thus far described, provides a magnetic meridian reference which, by means of suitable pick-offs on the directional gyroscope may be used, for example, for yaw control of an automatic pilot for an aircraft or missile. When visual indication of the magnetic meridian is required, the system may be adapted, as in above-mentioned Patent No. 2,574,471, to provide such indication on the face of the directional gyroscope unit. Frequently it is preferred to have such indication at one or more locations remote from the gyroscope. For this purpose, the rotor 14 of a synchro transmitter 15 is also fixed to lower pivot 4 of vertical ring 3, and is energized from the aircraft 400 cycle supply to produce a magnetic field which induces voltages in the Y-connected coils 16 of its stator. These voltages are reproduced in the corresponding coils 17 of the stator of a synchro receiver or repeater 18 which may be located at any convenient position in the aircraft. These voltages act on an energized rotor 19 having a shaft to which a pointer 20 is attached, whereby pointer 20 is moved relative to a suitably calibrated dial 21 to provide a visual indication of aircraft heading relative to the magnetic meridian.

Although a variety of conventional circuits may be used to perform the function required of amplifier 13, a preferred circuit that is particularly adapted for use with the present invention is shown in Fig. 2. In this circuit the signal from synchro rotor 12 is applied to a grid of twin triode 22, where it is amplified. It is further amplified by means of the second stage of the tube since the second grid of this tube is coupled in the plate circuit of the first stage, thus giving two stages of amplification. The plate output is then impressed across the primary of an interstage transformer 23, the secondary coil of which is connected with the plates of a second twin triode 24. Here the signal is matched against an 800-cycle reference voltage applied to both grids for phase detection. The 800-cycle reference voltage is obtained by picking off the double frequency ripple produced in the full-wave rectification of the 400-cycle voltage of the aircraft power supply through rectifier tube 25 and phase shifting network 26. In one side of tube 24, the reference wave and the signal wave tend to add; while in the other they tend to cancel, depending on the direction of the error signal from synchro 11.

Tube 24 is cathode coupled to a third double triode 27 which during normal slaving operation, has its cathodes energized from a 27 volt D.-C. source. The plates of tube 27 are connected, through contacts 28, 29 and armatures 30, 31 of relay 32, to the opposite ends of the control windings 33 and 34 of saturable reactor 35, such control windings being energized at their junction by unfiltered 270 volt D.-C. obtained from rectifier 25. The center-tapped primary winding 36 of saturable reactor 35 is energized from the aircraft power supply through transformer 37.

By means of this arrangement, the difference in amplitude of the signals applied to the grids of tube 24 produces a difference in the amount of current flow in the plates of tube 27. This difference is reflected in a change of inductance in each half of saturable reactor 35, permitting a greater flow of current in one direction or the other. This differential current is fed from the center tap of winding 36 through lead 38, contact 39 and armature 40 of relay 41, and lead 42 to control winding 6 of torque motor 5 to apply torque in the correct sense and in the appropriate magnitude to precess gyroscope 1 in the proper direction to bring synchro rotor 12 into its zero signal relation with the vector established by stator windings 9 of flux valve 7. The values of the several components of this circuit are so selected that saturable reactor 35 is normally operated well below its saturation point, and the maximum error signal from amplifier 13 results in a gyroscopic precession rate on the order of from three degrees to six degrees per minute. By this arrangement, the gyroscope is not appreciably disturbed by temporary fluctuations of the flux valve signal.

The system thus far described constitutes a conventional type of gyromagnetic reference system wherein the magnetic reference direction provided by the magnetic field sensitive device or flux valve is stabilized against short term disturbances of the directional gyroscope, and the gyroscope itself is slaved to the magnetic meridian against wandering or drift caused by bearing friction, unbalance, etc. During ideal steady state operation of this system, the inductances of both halves of saturable reactor 35 (Fig. 2) are in balance because there is zero signal from rotor 12 of synchro 11.

In order to indicate whether or not this zero error condition exists, the invention includes a meter 43 (see also Fig. 3) which is connected in series with a load resistor 44 across the outputs of tube 27 by means of leads 45 and 46. Meter 43 is mounted on an instrument panel 47 for the convenience of the pilot, and is preferably a polarity-sensitive, null-reading microammeter of such rating that a differential signal from tube 27 equivalent to a discrepancy of approximately eight degrees between the magnetic reference direction and the gyroscopic reference direction causes a full scale deflection of its needle 48 in the appropriate direction.

During normal operation of the system in flight, meter needle 48 constantly fluctuates about its null or index position because of minute discrepancies between the magnetic and gyroscopic directions caused by pendulosity of the flux valve. This motion is an indication to the pilot that the system is functioning properly. However, if, after an acrobatic maneuver or high rate turn, needle 48 maintains a full scale deflection in either direction for an appreciable period, it indicates that there may be a sizable discrepancy between the magnetic and gyroscopic reference directions.

Although this error would gradually be erased at the normal slaving rate of the system, it is preferred that the pilot be enabled immediately to restore synchronism in the system so that he may have a stabilized magnetic heading reference available for navigational purposes. To this end the invention includes a toggle switch 49, actuated by handle 50 (Figs. 2 and 3), whereby the system may be switched temporarily from "slaved gyro" operation, described above, to "free gyro" operation. The closing of switch 49 serves to connect a 28 volt D.-C. source through lead 51 to energize relay 41 to disengage armature 40 from contact 39, thereby disconnecting control winding 6 of torque motor 5 from the output of saturable reactor 35.

In this condition, directional gyroscope 1 is freed of any precessing control and maintains its then attained position as a free gyroscope. However, meter 43 remains under the control of the output of amplifier 13 and continues to indicate the existence and sense of discrepancy between the gyroscopic and magnetic reference directions. It will be obvious that during operation of the system when switch 50 or 92 is closed, the 27 volt D.-C. supply is disconnected from the cathodes of tube 27 or substantially reduced so that they are at a lowered potential such as at substantially ground potential. In order to control the operation of the system in this situation, the invention also provides a three-position, multipole switch 52, settable by handle 53, to perform the following functions:

(1) To establish a second signal generating circuit to provide high rate precessing control signals for directional gyroscope 1, (2) To establish a circuit to maintain meter 43 operative under control of amplifier 13 during the period that gyroscope 1 is controlled by the second signal generating means.

Depending on the sense or direction of the discrepancy indicated by meter 43, the pilot turns handle 53 to the right or left, as required, to increase or decrease the gyroscopic reference direction indicated on dial 21 (Fig. 1).

In either operated position of handle 53, the second signal generating circuit is established by four poles of switch 52, as follows:

(1) By means of pole 54, the 28 volt D.-C. source is connected through switch 49, lead 51, pole 54, contact 55 or 56, and lead 57 to energize relay 32 to disengage armatures 30 and 31 from contacts 28 and 29, respectively, and engage them with contacts 58 and 59, respectively, thereby disconnecting saturable reactor 35 from amplifier 13;

(2) By means of pole 60, the output of saturable reactor 35 is connected through lead 38, lead 61, pole 60, contact 62 or 63, and lead 42 to control winding 6 of torque motor 5, thereby re-establishing a circuit between reactor 35 and motor 5;

(3) By means of poles 64 and 65, one or the other of control wndings 33 or 34 of saturable reactor 35 is connected to ground through a parallel resistor network to produce a high level precessing voltage of the proper sense, depending on the direcion in which handle 53 is turned. For example, when handle 53 is turned to the right, winding 33 is connected to ground through armature 30, contact 58, lead 66, contact 67, pole 64, lead 68, pole 65, contact 69, lead 70, and resistors 71 and 72; while winding 34 remains open-circuited. Whereas, when handle 53 is turned to the left, winding 34 is connected to ground through armature 31, contact 59, lead 73, contact 74, pole 65, lead 68, pole 64, contact 75, lead 70, and resistors 71 and 72; while winding 33 remains open-circuited.

Thus, in either operated setting of switch 52, saturable reactor 35 is disconnected from output tube 27 and winding 33 or 34 thereof is connected to ground through the relatively low impedance of resistive network 71, 72, thereby causing a high current drain from the power supply through such winding. This current flow fully saturates one side or the other of reactor 35 and causes an impedance unbalance such that a much higher voltage is applied to torque motor 5 than is applied during normal operation under control of amplifier 13. Preferably the circuit values are so selected that under these conditions directional gyroscope 1 is precessed at a rate of approximately 90 degrees per minute, as compared to the three to six degrees per minute rate obtained when the system is slaved to flux valve 7.

In order to maintain meter 43 operative in either setting of switch 52 during this mode of operation, an energizing circuit is established independently of saturable reactor 35, by the three remaining poles of switch 52, as follows:

(1) By means of pole 76, the 28 volt D.-C. supply is connected through lead 77, contact 78 or 79, pole 76, lead 80, resistor 81, and lead 46 to one side of meter 43 and to one of the plates of output tube 27 of amplifier 13;

(2) By means of pole 82, the 28 volt D.-C. supply is connected through resistor 83, which is equal in value to resistor 81, lead 84, contact 85 or 86, pole 82, and lead 87 to the opposite side of meter 43; and (3) By means of pole 88, the 28 volt D.-C. supply is connected through lead 87, pole 88, contact 89 or 90, and leads 91 and 45 to the other plate of output tube 27, thereby shunting resistor 44.

With this arrangement, when either plate of output tube 27 is conducting (the cathodes of tube 27 now being at substantially ground potential) current flows in the associated line 45, etc., or 46, etc., and results in a voltage drop across the associated resistor 83 or 81, thereby causing current to flow through meter 43 in the appropriate direction to cause the meter to function, as above. Thus, in either operated position of switch 52, meter 43 remains energized and indicates the sense or direction of the discrepancy between the gyroscopic and magnetic reference directions.

In operation, switches 49 and 52 are maintained in their actuated positions until gyroscope 1 is precessed sufficiently to reduce the discrepancy between the gyroscopic reference direction and the magnetic reference direction to zero, i. e., until needle 48 of meter 43 is returned to its null or index position. When this occurs, the pilot turns switch handle 53 to its center position and restores switch handle 50 to its "slaved gyro" position, whereby the system is returned to its conventional mode of operation, as described above, wherein directional gyroscope 1 is slaved to the magnetic meridian by flux valve 7.

The description thus far relates to the operation of the invention while the aircraft is in flight. For such operation it is apparent that the several switches operated by handles 50 and 53 could be combined and be actuated by a single handle, if so desired. However, in the case of carrier aircraft being prepared for flight on a carrier deck, a slightly different condition exists. In such a case the error between the gyroscopic reference direction and the direction of the magnetic field may initially be as much as 180 degrees. In addition, because of the local distortion of the earth's magnetic field caused by the metal hull of the carrier, the magnetic reference direction provided by flux valve 7 may be substantially in error. Thus, although a fast precessing rate is required to bring the system into synchronism within practical time limits, meter 43 cannot be depended upon to indicate that the gyroscopic reference direction corresponds to the magnetic reference direction.

In such a situation the pilot closes switch 49, as above, to disconnect gyroscope 1 from the control of flux valve 7. He then obtains verbal instructions from the carrier's bridge as to the actual heading of his aircraft relative to the magnetic meridian. He then turns switch handle 53 to the right or left, as required, to apply the fast rate precessing signal to gyroscope 1 to increase or decrease the heading indication shown on dial 21 until it corresponds to the heading information received from the carrier's bridge. When correspondence is effected, he restores switch handle 53 to its center position to prevent the application of further precessing signals to torque motor 5, whereby gyroscope 1 functions independently as a free directional gyroscope to maintain the required direction reference.

Throughout this procedure and until after take-off, meter 43 may indicate a discrepancy between the gyroscopic and magnetic reference directions. However, since it is known that the flux valve signal is probably in error, any indication on meter 43 should be ignored. When the aircraft is well clear of the carrier's magnetic field, flux valve 7 may again be depended upon to determine the magnetic meridian, and needle 48 of meter 43 should be substantially at its index position. At this point, the pilot opens switch 49 to restore gyroscope 1 to the control of flux valve 7 to maintain correspondence between the gyroscopic and magnetic reference directions.

In systems that are to be used primarily on carrier aircraft, it is preferred to incorporate a landing gear switch 92 that is connected in parallel with switch 49 between the 28 volt D.-C. source relay 41. Switch 92 is of such construction that it is arranged to be closed when the weight of the aircraft is supported by its landing gear, and to be opened when the aircraft is airborne. By this arrangement, gyroscope 1 is automatically disconnected from the control of flux valve 7 whenever the aircraft is on the carrier deck and, therefore, is unaffected by any erroneous signal that may be generated by the flux valve.

Although the form of the invention described above is preferred to provide a properly balanced circuit in conjunction with the particular type of gyromagnetic reference system with which it is shown, it is to be understood that the specific circuitry employed in any instance may be varied appreciably within the scope of the present invention. For example, Fig. 1 includes a schematic representation of a circuit to perform the basic functions of the invention wherein switches 93 and 94 are interposed in the leads connecting compass amplifier 13 with control winding 6 of torque motor 5, and a meter 95 is connected across the amplifier output leads to indicate the direction and extent of asynchronism between the gyroscopic and gyromagnetic reference directions.

In this arrangement switch 93 is a double-pole, multi-contact switch which, in its mid-position, permits the system to function as described above in connection with Fig. 1. When meter 95 indicates asynchronism between the gyroscopic and gyromagnetic reference directions, switch 93 may be actuated to engage either of two sets of contacts which are connected to oppositely wound secondary windings of a transformer 96 which is supplied from a suitable A. C. source. Thus, depending on the direction of asynchronism indicated by meter 95, switch 93 is moved in the proper direction to cause torque motor 5 to be energized in a sense to precess gyroscope 1 such that rotor 12 becomes positioned to a zero signal relationship with respect to the magnetic vector established by flux valve 7. In order to permit gyroscope 1 to function as a directional gyroscope independently of flux valve 7, when desired, switch 93 may be provided with additional detent positions (not shown) in which the leads to torque motor 5 are open circuited. For simplicity of illustration, the latter function may also be performed by a double-pole, double-throw switch 94.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A directional reference system comprising a directional gyroscope, a magnetic compass device, a means coupled between said gyroscope and said compass for supplying a signal corresponding to the discrepancy between the direction of the earth's magnetic field and the orientation of said gyroscope, precessing means coupled with said gyroscope for varying the orientation thereof, means for controlling said precessing means in accordance with said signal whereby to slave the orientation of said gyroscope to the direction of said magnetic field, switch means for disconnecting said precessing means from the control of said signal whereby said gyroscope operates as a free gyroscope, and indicating means continuously connected to receive said signal for providing an indication of any discrepancy between the orientation of said gyroscope and the direction of said magnetic field during both said slave and free gyroscope operation.

2. A directional reference system comprising a directional gyroscope, a magnetic compass device having means for supplying a signal corresponding to the direction of the earth's magnetic field, a pick-off on said gyroscope connected to receive said compass signal for supplying a signal corresponding to the discrepancy between the direction of the earth's field and the orientation of said gyroscope, precessing means coupled with said gyroscope for varying the orientation thereof, means for controlling said precessing means in accordance with said signal whereby to slave the orientation of said gyroscope to the direction of said magnetic field, first switch means for disconnecting said precessing means from the control of said signal whereby said gyroscope operates as a free gyroscope, second switch means operable during said free gyroscope operation for manually varying the orientation of said gyroscope, and indicating means connected to receive said signal upon actuation of either of said switch means whereby to indicate any discrepancy between the orientation of said gyroscope and the direction of said magnetic field during both slave gyroscope and free gyroscope operations.

3. A gyromagnetic compass system comprising a directional gyroscope, precessing means coupled with said gyroscope for varying the orientation thereof, a device for determining the direction of the earth's magnetic field, signal generating means coupled between said gyroscope and said device for supplying a signal corresponding to the discrepancy between the orientation of said gyroscope and the direction of said magnetic field, an indicator responsive to said signal for indicating the direction and magnitude thereof, a source of energy for said gyroscope precessing means, switch means having one position thereof for controlling the energy supplied to said precessing means in accordance with said discrepancy signal whereby to vary the orientation of said gyroscope in a direction and an amount to reduce said signal toward zero and having another position thereof for removing the control of the energy supplied to said precessing means in accordance with said discrepancy signal and for adapting said gyroscope for manual orientation, and means operable during manual orientation for maintaining said indicator responsive to said discrepancy signal whereby to indicate the direction and amount of manual control required to reduce said signal to zero and thereby effect manual orientation of said gyroscope in correspondence with said magnetic field.

4. A directional reference system of the character set forth in claim 3 further including means controlled by said switch means in said one position thereof for controlling said energy source such that for a maximum value of said discrepancy signal said gyro will precess at a predetermined maximum rate, and means controlled by said switch means in said other position thereof for controlling said energy source such that said gyro will precess at a rate substantially greater than said predetermined maximum rate.

5. A directional reference system comprising a directional gyroscope having precessing means coupled therewith for varying the orientation thereof, a magnetic compass device having means for supplying a signal corresponding to the direction of the earth's magnetic field, pick-off means coupled between said gyroscope and said compass device for supplying a signal corresponding to the discrepancy between the direction of the earth's field and the orientation of said gyroscope, an indicator connected to receive said signal for indicating any discrepancy between the orientation of said gyroscope and the direction of said field, a source of energy for said precessing means, a first switch means having one position thereof for controlling the energy supplied to said precessing means in accordance with said discrepancy signal whereby to slave said gyroscope orientation into correspondence with the direction of the earth's field, and having another position thereof for removing from said precessing means the control of energy from said source in accordance with said discrepancy signal whereby said gyroscope operates as a free gyroscope, a second switch means operable during said free gyroscope operation for manually controlling the energy supplied to said precessing means from said energy source whereby to manually orient said gyroscope, and means associated with said second switch means for maintaining said indicator responsive to said discrepancy signal during said manual orientation operation whereby to indicate the direction and amount of manual control required to reduce said signal to zero and thereby effect manual orientation of said gyroscope in correspondence with said magnetic field.

6. A directional reference of the character set forth in claim 5 further including means controlled by said first switch means in said one position thereof for controlling said energy source such that for a maximum value of said discrepancy signal said gyro will precess at a predetermined maximum rate, means controlled by said switch means in said other position thereof for controlling said energy source such that such gyro will precess at a rate substantially greater than said predetermined maximum rate.

References Cited in the file of this patent

UNITED STATES PATENTS

| 1,982,702 | Sperry | Dec. 4, 1934 |
| 2,410,473 | Weems | Nov. 5, 1946 |
| 2,574,471 | Fragola | Nov. 13, 1951 |